United States Patent
Hirata et al.

(10) Patent No.: US 9,544,000 B2
(45) Date of Patent: Jan. 10, 2017

(54) CARD CONNECTOR

(71) Applicant: Molex, LLC, Lisle, IL (US)

(72) Inventors: Toshihisa Hirata, Yamato (JP); Nobuki Ukita, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/950,051

(22) Filed: Nov. 24, 2015

(65) Prior Publication Data

US 2016/0164226 A1    Jun. 9, 2016

(30) Foreign Application Priority Data

Dec. 4, 2014  (JP) .................................. 2014-245511

(51) Int. Cl.
*H01R 24/00* (2011.01)
*H04B 1/3816* (2015.01)

(52) U.S. Cl.
CPC ................................. *H04B 1/3816* (2013.01)

(58) Field of Classification Search
CPC ...... H01R 27/00; H01R 13/635; H01R 13/633
USPC ........................................ 439/630, 159, 160
See application file for complete search history.

(56) References Cited

U.S. PATENT DOCUMENTS

| 5,655,917 | A | 8/1997 | Kaneshige et al. | |
|---|---|---|---|---|
| 2013/0267106 | A1* | 10/2013 | Jenks | G11B 17/00 439/160 |
| 2014/0078682 | A1* | 3/2014 | Jenks | G11B 17/00 361/727 |
| 2015/0155900 | A1* | 6/2015 | Myers | G06K 13/08 455/558 |
| 2015/0207284 | A1* | 7/2015 | Liu | G06K 7/0052 439/218 |
| 2016/0164226 | A1* | 6/2016 | Hirata | H04B 1/3816 439/155 |

FOREIGN PATENT DOCUMENTS

| JP | 2012-234669 A | 11/2012 |
|---|---|---|
| JP | 3189284 U | 12/2014 |

\* cited by examiner

*Primary Examiner* — Phuongchi T Nguyen
(74) *Attorney, Agent, or Firm* — James A. O'Malley

(57) ABSTRACT

The card connector includes a socket for inserting a tray, the socket having an ejector for ejecting the inserted tray in response to a pushing operation performed using a pin inserted into a through-hole in the tray, and a lock portion extending from the proximal portion of the socket in an oblique direction vertically with respect to the insertion direction of the tray and engaging an engaged portion of the tray on the proximal side of the ejector, the lock portion being disengaged from the engaged portion of the tray by the leveling action of the pin inserted into the through-hole, and the ejector being pushed in by the pin having leveled the lock portion.

6 Claims, 12 Drawing Sheets

CARD CONNECTOR

This application claims priority to Japanese Application No. 2014-245511, filed Dec. 4, 2014, which is incorporated herein by reference in its entirety.

TECHNICAL FIELD

The present disclosure relates to a card connector receiving a card via a tray.

BACKGROUND ART

Electronic devices such as personal computers, mobile phones, smartphones, personal digital assistants (PDAs), digital cameras, video cameras, music players, gaming devices, and car navigation systems include connectors that allow various types of devices to be used. These include Subscriber Identity Module (SIM) cards, Multi-media Cards® (MMC), Secure Digital® (SD) cards, miniSD® cards, xDPicture® cards, Memory Sticks®, Memory Stick Duo®, Smart Media®, Trans-Flash® memory cards, and MicroSD® cards.

Among card connectors, there are card connectors into which a card is inserted directly, and card connectors into which a tray housing a card is inserted. In the case of the latter, there is great design freedom with respect to the shape of the tray, and these can include a locking mechanism to keep the tray from being ejected inadvertently, and mechanisms including an ejector which allows the tray to be ejected easily simply by inserting a pin. A card connector is disclosed, for example, in Patent Document 1 which includes a locking mechanism which locks a tray to prevent inadvertent ejection and which unlocks the tray using an ejector which is pushed in by inserting a pin. In this configuration, a protruding portion is provided on a side portion of the ejector which engages a recessed portion on the tray using spring action.

[Patent Document 1] JP 2012-234669 A

SUMMARY OF THE INVENTION

However, the lock mechanism in the card connector disclosed in Patent Document 1 requires strong spring action to keep the tray from flying out when the smartphone or other device housing the tray is dropped. Because the spring action is so strong, the tray sometimes cannot be unlocked even when a pin is pushed into unlock the tray. The spring in the lock mechanism also raises the number of components in the card connector and increases the size of the card connector. For example, because the spring is arranged on an outside portion of the ejector in the card connector disclosed in Patent Document 1, the width of the card connector is increased.

It is an object of the present disclosure to solve this problem by providing a card connector having a lock mechanism which prevents the flying out of the tray and which is not dependent on spring action yet able to perform the unlocking operation easily, thereby eliminating the spring, reducing the number of components, and reducing the size of the connector.

The present disclosure has been proposed to solve this problem. The card connector comprises: a tray for mounting a card, the tray having a panel portion rising from the proximal portion through which a through-hole has been formed; and a socket for inserting the tray, the socket being provided at a location facing the through-hole in the tray and having an ejector for ejecting an inserted tray in response to a pushing operation performed using a pin inserted into the through-hole; the socket having a lock portion extending from the proximal portion in an oblique direction vertically with respect to the insertion direction of the tray and engaging an engaged portion of the tray on the proximal side of the ejector; the lock portion being disengaged from the engaged portion of the tray by the leveling action of the pin inserted into the through-hole; and the ejector being pushed in by the pin having leveled the lock portion.

In the disclosure, the socket has a housing for accommodating the tray, and the lock portion extends from the proximal portion of the housing upward obliquely in the insertion direction of the tray.

In the disclosure, the socket has a shell covering the housing, the shell has an extended portion extending from the proximal portion so as to cover at least the top of the lock portion, and the extended portion provides at least upward clearance for the pin leveling the lock portion.

In the disclosure, the extended portion has a recessed portion narrowing the insertion path of the pin.

In the disclosure, the socket has a housing for accommodating the tray and a shell covering the housing, and the lock portion extends from the proximal portion of the shell downward obliquely in the insertion direction of the tray.

In the disclosure, the housing has an extended portion extending from the proximal portion so as to cover at least the bottom of the lock portion, and the extended portion provides at least downward clearance for the pin leveling the lock portion.

The present disclosure is able to provide a card connector having a lock mechanism which prevents the flying out of the tray and which is not dependent on spring action yet able to perform the unlocking operation easily, thereby eliminating the spring, reducing the number of components, and reducing the size of the connector.

DETAILED DESCRIPTION OF THE PREFERRED EMBODIMENTS

The following is an explanation of preferred embodiments of the present disclosure with reference to the drawings.

Figure 1:
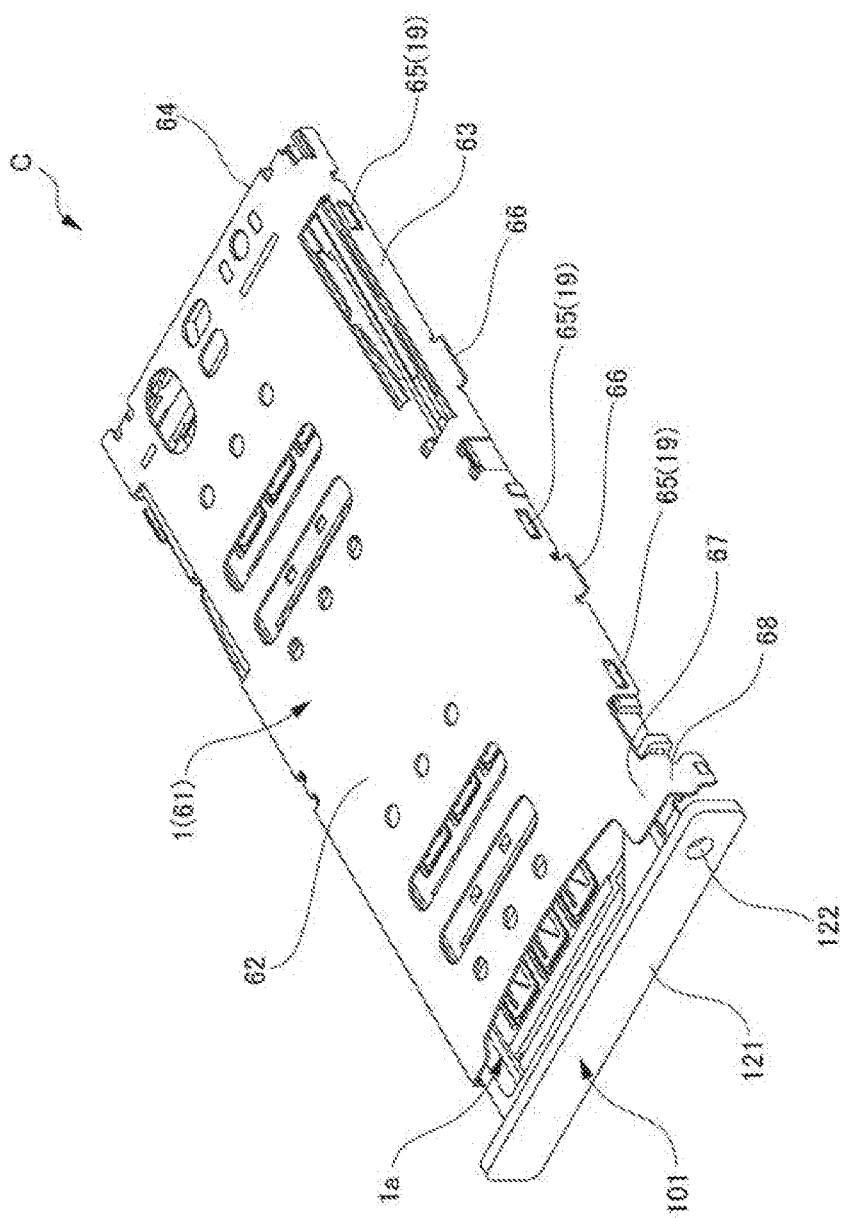
FIG. 1 is a perspective view of the card connector in a first embodiment of the present disclosure (not containing a card).
Figure 2:
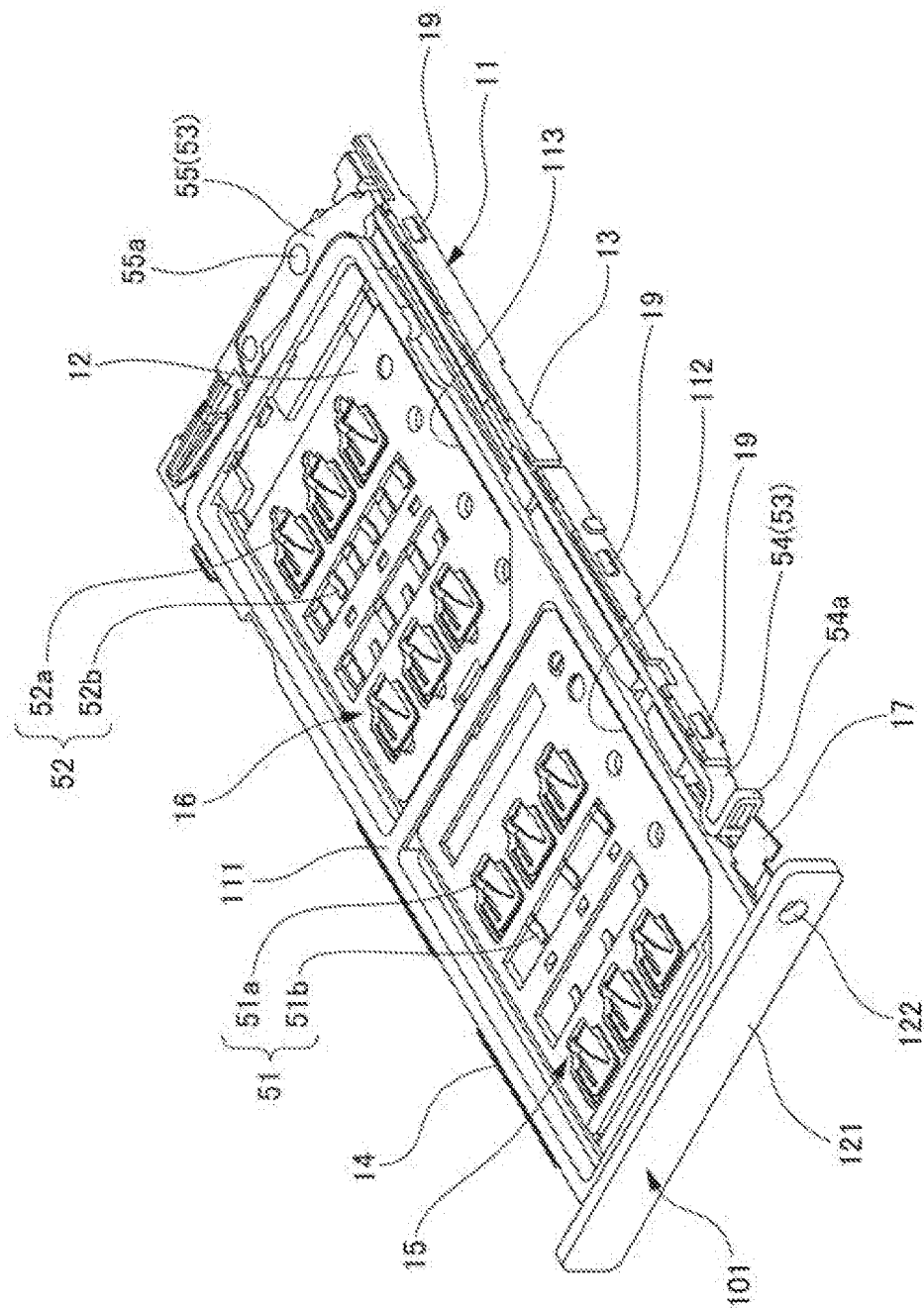
FIG. 2 is a perspective view of the card connector in the first embodiment of the present disclosure (not containing a card, shell removed).
Figure 3:
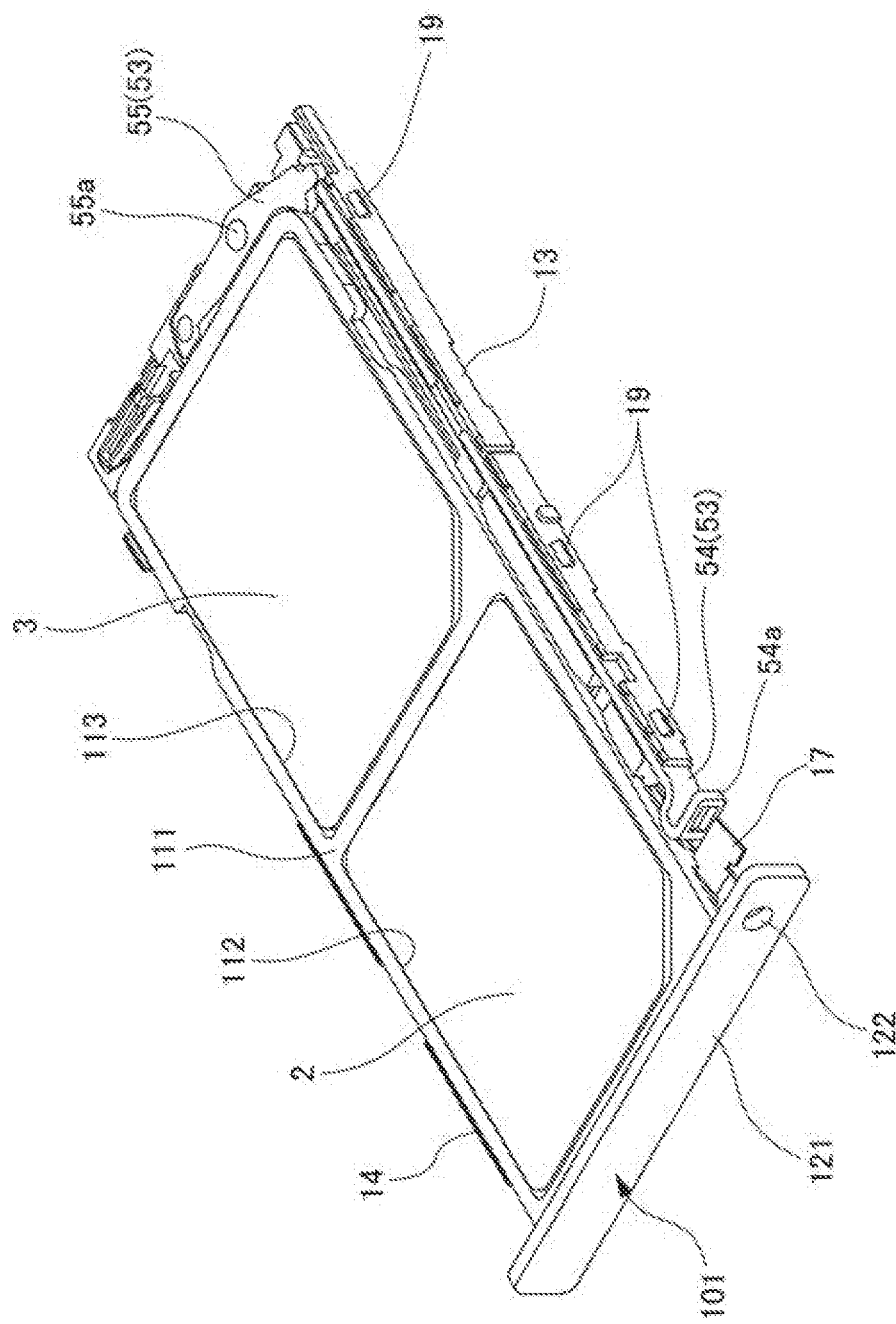
FIG. 3 is a perspective view of the card connector in the first embodiment of the present disclosure (containing a card, shell removed).

FIG. 1 is a perspective view of the card connector in a first embodiment of the present disclosure (not containing a card), FIG. 2 is a perspective view of the card connector in the first embodiment of the present disclosure (not containing a card, shell removed), and FIG. 3 is a perspective view of the card connector in the first embodiment of the present disclosure (containing a card, shell removed). As shown in FIG. 1 through FIG. 3, the card connector C in the present embodiment includes a tray 101 for housing a card 2, 3 and a socket 1 for receiving the inserted tray 101.

The card 2, 3 is housed inside the tray 101, which is then inserted into a socket 1 installed in an electronic device (not shown) and mounted in the electronic device. The electronic device can be any type of electronic device such as a personal computer, mobile phone, smartphone, personal digital assistant (PDA), digital camera, video camera, music player, gaming device, or car navigation system.

The card 2, 3 can be any type of card such as a SIM card, MMC® (Multi Media) card, SD® (Secure Digital) card, miniSD® card, xD-Picture® card, Memory Stick®, Memory Stick Duo®, Smart Media®, or Trans-Flash® memory card. In the present embodiment, the card 2, 3 is a microSIM® card.

In the present embodiment, the expressions indicating direction, such as upper, lower, left, right, front and rear, which are used to explain the configuration and operation of each portion of the card connector C, socket 1, tray 101, and card 2,3, are relative and not absolute. They depend on the orientation of the card connector C, socket 1, tray 101, and card 2, 3, and their constituent components shown in the drawings. When the orientation of the card connector C, socket 1, tray 101, and card 2, 3 or their constituent components changes, the interpretation changes in response to the change in orientation.

The tray 101 is made of a resin material or metal, and has a tray main body 111 for housing a card 2, 3, and a front panel portion 121 (panel portion) rising from the proximal side of the tray main body 111. The front panel portion 121 has a shape which covers the insertion slot 1a of the socket 1 when a tray 101 is inserted into the socket 1, and a through-hole 122 is formed in one end for inserting a pin 4 when the tray 101 is to be ejected.

Two card mounting portions 112, 113 are formed side by side in the tray main body 111 of the present embodiment and are able to receive mounted cards 2, 3. Each card mounting portion 112, 113 has an open bottom portion so that the connecting pads on the cards 2, 3 are exposed via the opening when cards 2, 3 having connecting pads (not shown) formed on the bottom surface are mounted in the card mounting portions 112, 113. The tray 101 in the present embodiment has two card mounting portions 112, 113, but any number of card mounting portions 112, 113 can be installed, and the arrangement of the card mounting portions 112, 113 can also be changed.

The socket 1 has a housing 11 which is obtained by insert molding a metal panel portion 11a serving as a reinforcing member (see, for example, FIG. 7) and a resin portion 11b serving as the insulating member (see, for example, FIG. 7), and a shell 61 or cover member mounted on top of the housing 11 which is obtained by stamping and bending a conductive metal plate. The socket houses a tray 101 inserted into the insertion slot 1a formed in the front end portion, and establishes an electrical connection with the cards 2, 3 mounted inside the tray 101.

The housing 11 has a bottom panel portion 12 running along the mounted board surface, a right side wall portion 13 rising from one side edge of the bottom panel portion 12, and a left side wall portion 14 rising from the other side edge of the bottom panel portion 12. The bottom panel portion 12 includes a first terminal holding portion 15 in which six connecting terminals 51 for card 2 are mounted, and a second terminal holding portion 16 in which six connecting terminals 52 for card 3 are mounted. In the present embodiment, the connecting terminals 51, 52 are integrated with the resin portion of the housing 11 using insert molding. However, the connecting terminals 51, 52 can be attached to the housing 11 using any other method.

Each connecting terminal 51, 52 has a contact portion 51a, 52a and a board connection portion 51b, 52b. Each contact portion 51a, 52a extends upward at an oblique angle towards the rear of the bottom panel portion 12, and establishes elastic contact and an electrical connection with the corresponding connecting pad on a card 2, 3 housed inside the inserted tray 101. Each board connection portion 51b, 52b is electrically connected by solder to a wiring pattern formed in a board in the electronic device.

Figure 4:
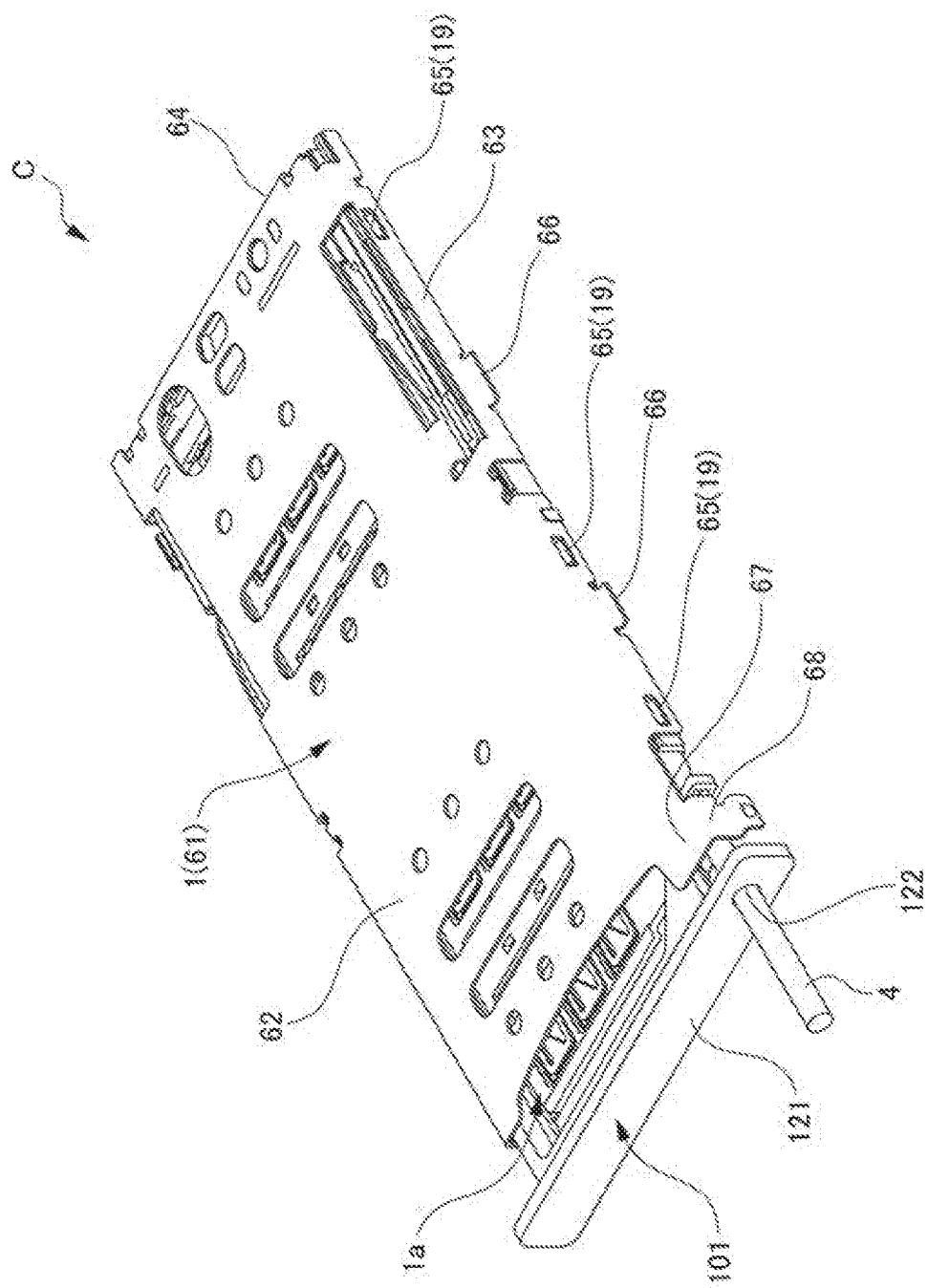
FIG. 4 is a perspective view of the card connector in the first embodiment of the present disclosure (not containing a card) showing a pin inserted.
Figure 5:
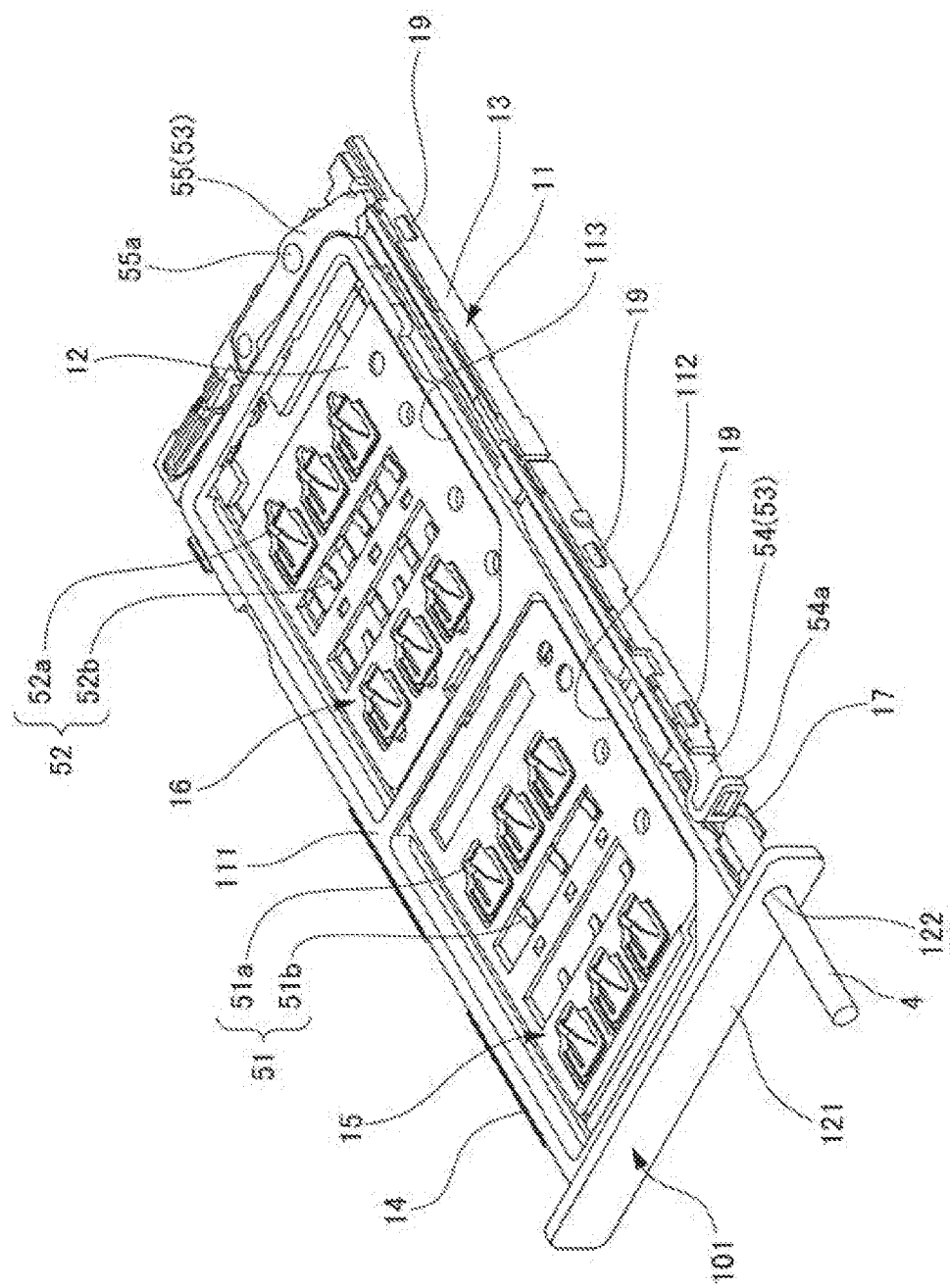
FIG. 5 is a perspective view of the card connector in the first embodiment of the present disclosure (not containing a card, shell removed) showing a pin inserted.
Figure 6:
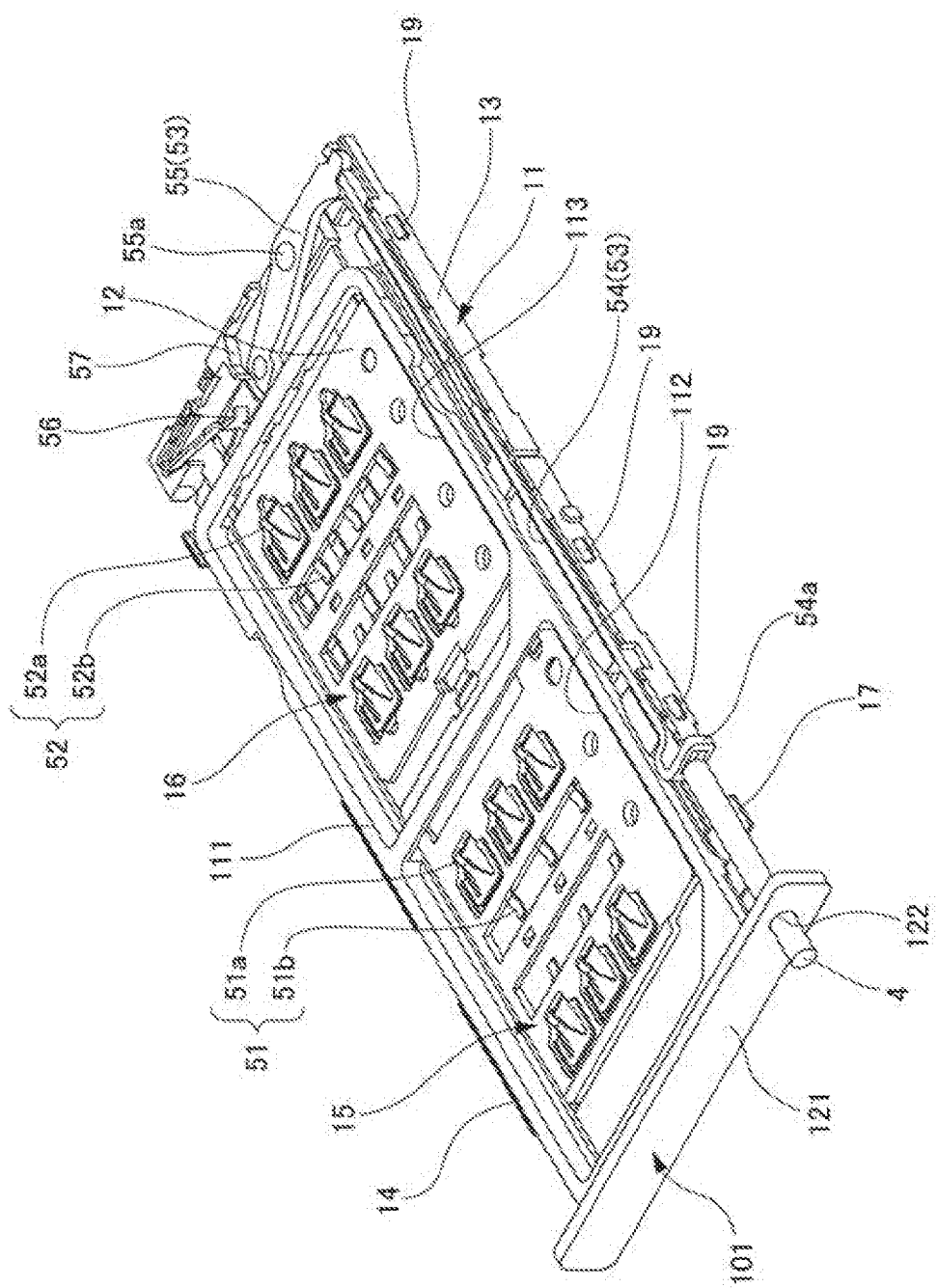
FIG. 6 is a perspective view of the card connector in the first embodiment of the present disclosure (not containing a card, shell removed) showing the pin pushing in the ejector.

FIG. 4 is a perspective view of the card connector in the first embodiment of the present disclosure (not containing a card) showing a pin inserted, FIG. 5 is a perspective view of the card connector in the first embodiment of the present disclosure (not containing a card, shell removed) showing a pin inserted, and FIG. 6 is a perspective view of the card connector in the first embodiment of the present disclosure (not containing a card, shell removed) showing the pin pushing in the ejector. As shown in FIG. 4 through FIG. 6, the housing 11 includes an ejector 53 for ejecting a tray 101 inserted into the socket 1 in response to a pushing operation performed using a pin 4.

The ejector 53 in the present embodiment is arranged along one side edge of the housing 11, and includes an ejection bar 54 able to slide in the longitudinal direction or the insertion/ejection direction of the tray 101, and an ejection lever 55 arranged along the rear edge portion of the housing 11 which is able to pivot freely in the longitudinal direction on a support shaft 55a serving as the fulcrum. The front end portion of the ejection bar 54 is arranged as a position facing the through-hole 122 in the tray 101, and the pushed-in portion 54a pushed in by the pin 4 is formed here. One end of the ejection lever 55 makes contact with the rear end of the ejection bar 54 from the rear, and the other end of the ejection lever 55 makes contact with the rear edge portion of the tray 101 inserted in the socket 1 from the rear.

In other words, when the tray 101 is inserted into the socket 1, the other end of the ejection lever 55 is pressed against the rear edge portion of the tray 101, causing the ejection lever 55 to pivot and the one end to push the ejection bar 54 forward. In this way, the ejection bar 54 is set to the ejection standby position.

When the tray 101 inserted into the socket 1 is ejected, a pin 4 is inserted into the through-hole 122 in the tray 101, and the tip pushes in the pushed-in portion 54a of the ejection bar 54. When the ejection bar 54 retreats in response to being pushed in, one end of the ejection bar 55 is pushed to the rear, causing the ejection lever 55 to pivot and the other end to push forward the rear edge of the tray 101. As a result, the proximal side of the tray 101 protrudes from the insertion slot 1a certain degree, allowing the tray 101 to be removed.

A first contact point member 56 and a second contact point member 57 are provided near the other end of the ejection lever 55, and a tray insertion detection switch is provided to detect the insertion of a tray 101. However, this tray insertion detection switch can be omitted if necessary.

Figure 7:
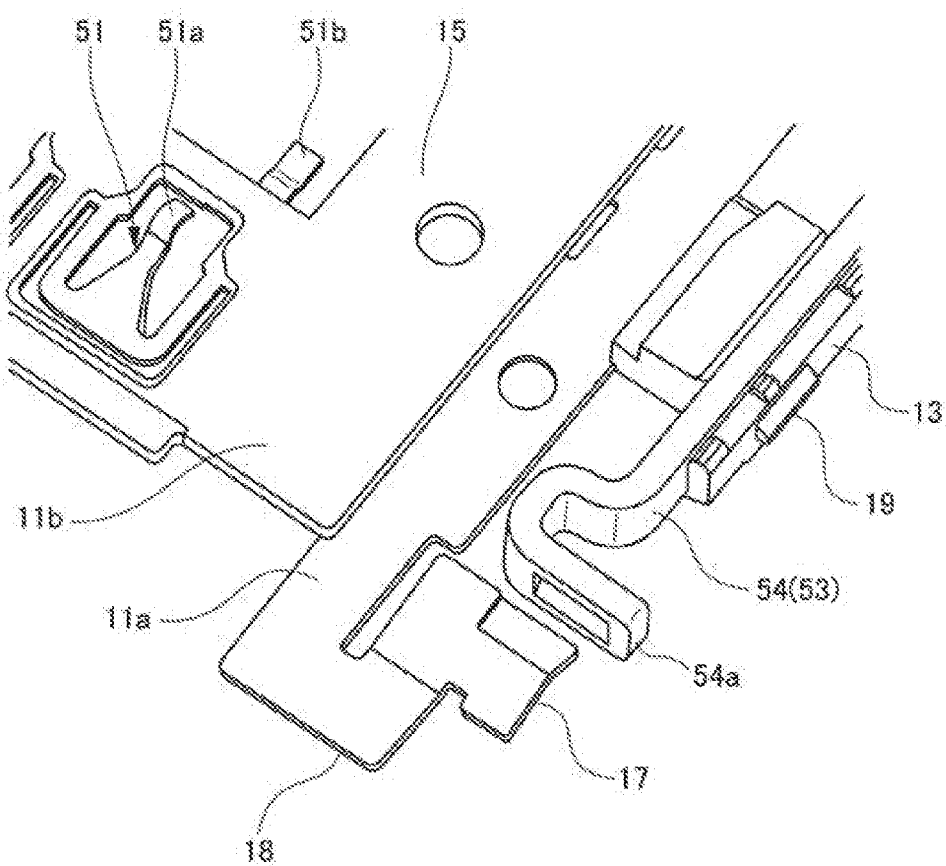
FIG. 7 is a partially enlarged perspective view of the card connector in the first embodiment of the present disclosure showing the lock portion.
Figure 8:
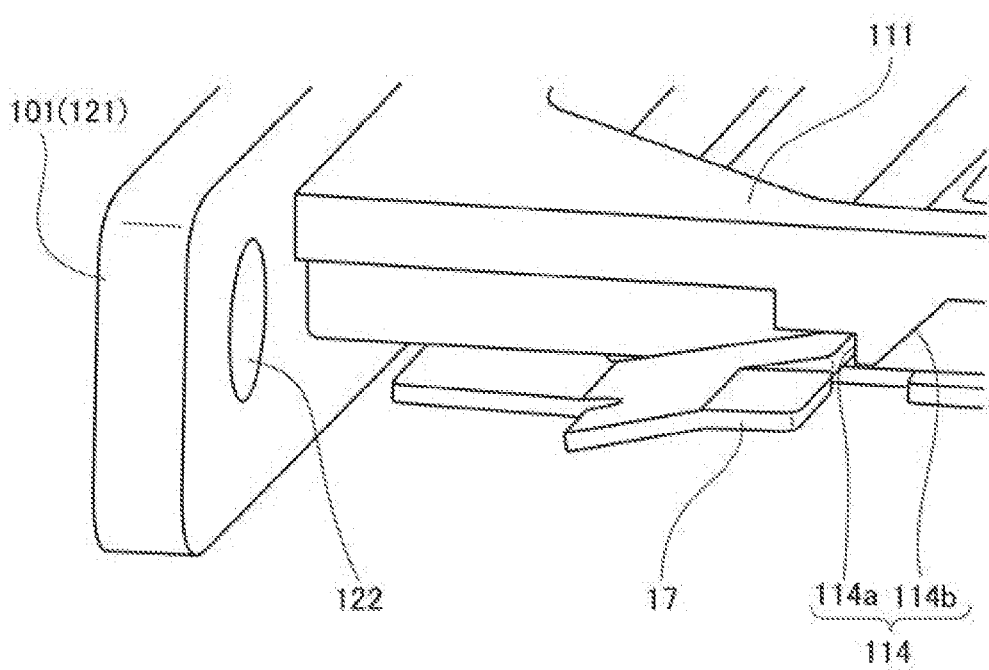
FIG. 8 is a partially enlarged perspective view of the card connector in the first embodiment of the present disclosure showing the lock portion engaging the engaged portion of the tray.

FIG. 7 is a partially enlarged perspective view of the card connector in the first embodiment of the present disclosure showing the lock portion, and FIG. 8 is a partially enlarged perspective view of the card connector in the first embodiment of the present disclosure showing the lock portion engaging the engaged portion of the tray. As shown in FIG. 7 and FIG. 8, the housing 11 includes a lock portion 17 extending from the proximal portion in an oblique direction upwards with respect to the insertion direction of the tray 101 and engaging an engaged portion 114 of the tray 101 on the proximal side of the pushed-in portion 54a of the ejector 54. In the present embodiment, a metal panel portion 11a serving as a reinforcing member of the housing 11 is used to form the lock portion 17. More specifically, an extended portion 18 extending outward from the proximal portion of the metal panel portion 11a, and a lock portion 17 extending upward obliquely towards the rear from the rear edge portion of the extended portion 18 are added.

The engaged portion 114 of the tray 101 is formed on one side surface of the tray main body 111 on the proximal side, and includes a tiered lock groove 114a for engaging the lock portion 17 and keeping the tray 101 from being ejected, and an inclined portion 114b formed continuously to the rear of the lock groove 114a so as to guide the inclined engagement of the lock portion 17. In other words, when the tray 101 is inserted into the socket 1, the lock portion 17 is displaced (elastically deformed) downward by the inclined guidance of the inclined portion 114b, overcomes the front end apex portion of the inclined portion 114b, and engages the lock groove 114a to lock the tray 101. Because the lock does not depend on spring action or frictional force, it is unlikely to become unlocked when subjected to an impact such as a drop. The lock portion 17 is unlocked by a tray 101 ejecting operation performed using a pin 4 as described below.

The shell 61 has a rectangular ceiling panel portion 62, side panel portions 63 extending downward from the left and right edges of the ceiling panel portion 62, and a rear panel portion 64 extending downward from the rear edge of the ceiling panel portion 62. A plurality of engagement holes 65 are formed in the side panel portions 63 and the rear panel portion 64. When the shell 61 is mounted on top of the housing 11, the engagement holes 65 engage engagement protrusions 19 formed on the sides of the housing 11, and the shell 61 is secured to the housing 11.

The shell 61 also has a plurality of mounting portions 66 extending outward from the bottom end portion of the side panel portions 63 and the rear panel portions 64. These mounting portions 66 are electrically connected to a wiring pattern formed on a board in the electronic device using soldering or some other means. In this way, the shell 61 is securely attached to a board in the electronic device, and a good noise-shielding function can be achieved.

The shell 61 has a first extended portion extending from the proximal portion so as to cover the top of the lock portion 17, and a second extended portion 68 extending downward from the outer end of the first extended portion 67. The first extended portion 67 and the second extended portion 68 define the insertion path of the pin 4. The operation of the pin is explained below.

The following is an explanation of the unlocking operations performed when the tray is ejected from the card connector C with reference to FIGS. 9(a), 9(b), 9(c), 10(a), 10(b) and 10(c).

Figure 9A:
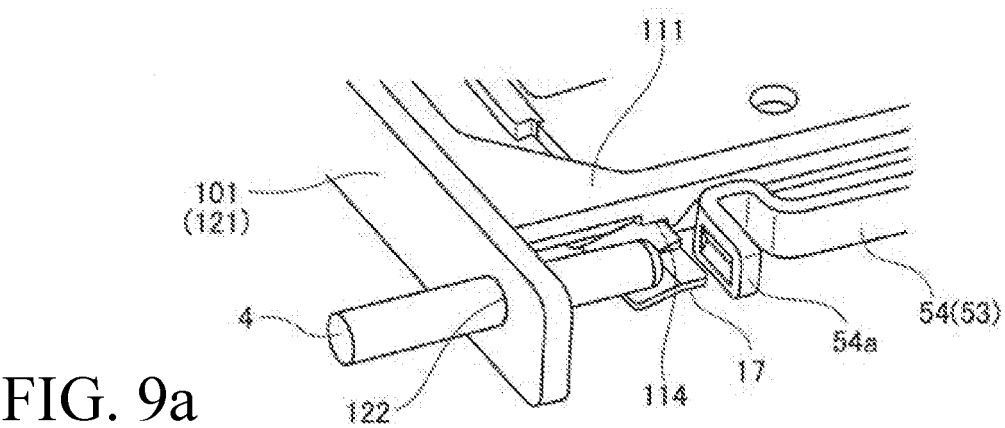
FIG. 9(a) is a partially enlarged perspective view showing an inserted pin as part of an operation performed to unlock and eject a tray from the card connector in the first embodiment of the present disclosure.
Figure 9B:
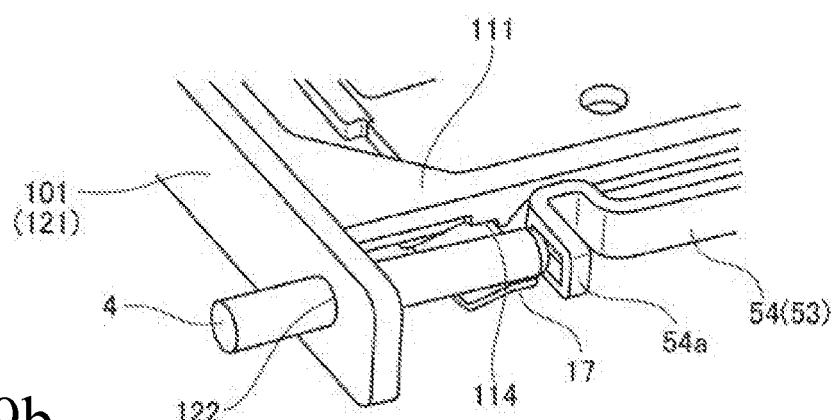
FIG. 9(b) is a partially enlarged perspective view showing the lock portion leveled (unlocked) by the pin as part of an operation performed to unlock and eject a tray from the card connector in the first embodiment of the present disclosure.
Figure 9C:
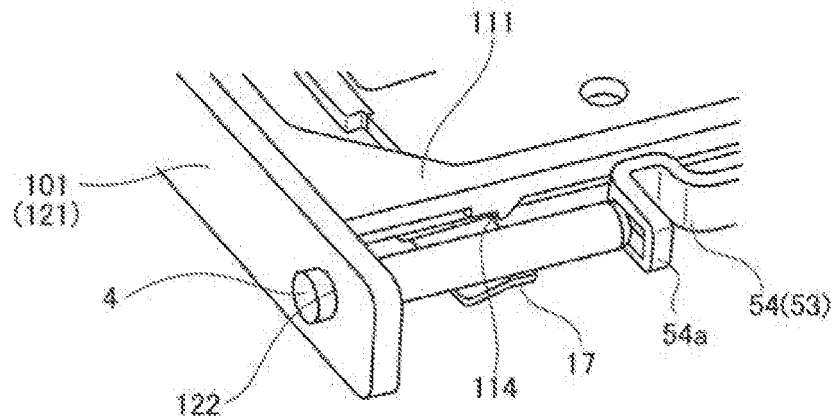
FIG. 9(c) is a partially enlarged perspective view showing the ejector pushed in by the pin as part of an operation performed to unlock and eject a tray from the card connector in the first embodiment of the present disclosure.
Figure 10A:
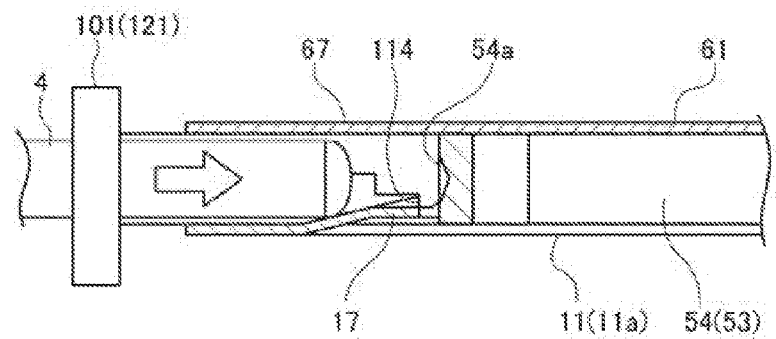
FIG. 10(a) is a partially enlarged side view showing an inserted pin as part of an operation performed to unlock and eject a tray from the card connector in the first embodiment of the present disclosure.
Figure 10B:
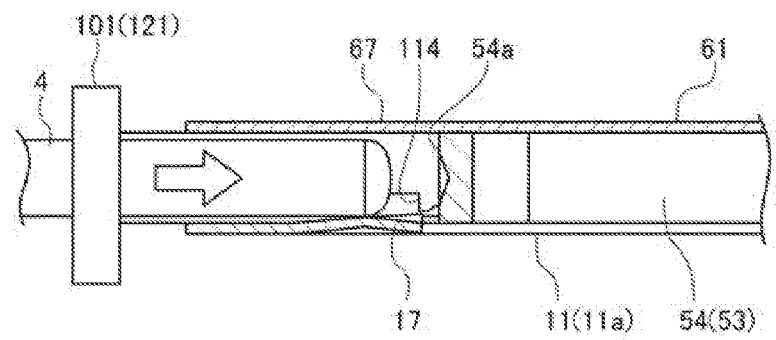
FIG. 10(b) is a partially enlarged side view showing the lock portion leveled (unlocked) by the pin as part of an operation performed to unlock and eject a tray from the card connector in the first embodiment of the present disclosure.
Figure 10C:
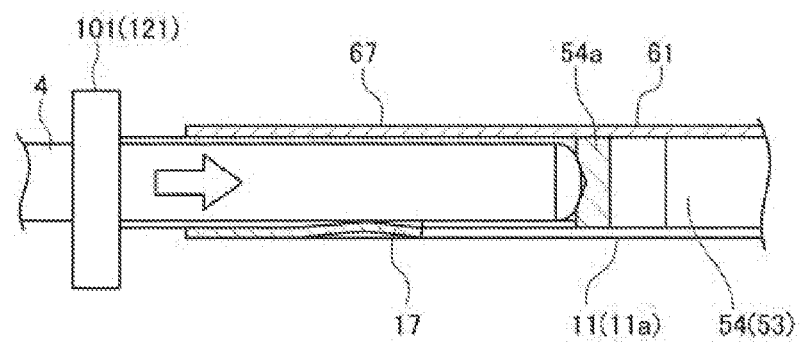
FIG. 10(c) is a partially enlarged side view showing the ejector pushed in by the pin as part of an operation performed to unlock and eject a tray from the card connector in the first embodiment of the present disclosure.

FIGS. 9(a), 9(b) and 9(c) are a set of drawings used to explain the operations performed to unlock and eject a tray from the card connector in the first embodiment of the present disclosure, in which FIG. 9(a) is a partially enlarged perspective view showing an inserted pin, FIG. 9(b) is a partially enlarged perspective view showing the lock portion leveled (unlocked) by the pin, and FIG. 9(c) is a partially enlarged perspective view showing the ejector pushed in by the pin. FIGS. 10(a), 10(b) and 10(c) are a set of drawings used to explain the operations performed to unlock and eject a tray from the card connector in the first embodiment of the present disclosure, in which FIG. 10(a) is a partially enlarged side view showing an inserted pin, FIG. 10(b) is a partially enlarged side view showing the lock portion leveled (unlocked) by the pin, and FIG. 10(c) is a partially enlarged side view showing the ejector pushed in by the pin.

When a tray 101 has been inserted into the socket 1, as shown in FIG. 9(a) and FIG. 10(a), the lock portion 17 of the housing 11 engages the engaged portion 114 of the tray 101, and the tray 101 is locked to prevent ejection. The ejection bar 54 of the ejector 53 is also set to the ejection standby position.

Here, as shown in FIG. 9(a) and FIG. 10(a), a pin 4 is inserted into the through-hole 122 in the tray 101 and when, as shown in FIG. 9(b) and FIG. 10(b), the pin 4 has been pushed into the location of the lock portion 17, the pin 4 pushes the inclined upper surface of the lock portion 17. This pushes down and levels the lock portion 17, releasing the lock portion 17 from the engaged portion 114 of the tray 101, and unlocking the tray 101 to be ejected. At this time, the pin 4 is kept from becoming dislodged upward by the first extended portion 67 in the shell 61 and is kept from becoming dislodged outward by the second extended portion 68. As a result, the lock portion 17 can be reliably leveled. When the pin 4 is pushed in further after the unlocking operation, the pushed-in portion 54a of the ejection bar 54 is pushed in by the pin 4, the tray ejection operation of the ejector 53 is activated, and the tray 101 is ejected.

In the embodiment described above, the card connector C has a tray 101 for mounting cards 2, 3, and a socket 1 for inserting the tray 101. The tray 101 has a front panel portion 121 rising from the proximal portion through which a through-hole 122 has been formed. The socket 1 is provided at a location facing the through-hole 122 in the tray 101 and has an ejector 53 for ejecting an inserted tray 101 in response to a pushing operation performed using a pin 4 inserted into the through-hole 122, and a lock portion 17 extending from the proximal portion of the socket 1 in an oblique direction vertically with respect to the insertion direction of the tray 101 and engaging an engaged portion 114 of the tray 101 on the proximal side of the ejector 53. The lock portion 17 is disengaged from the engaged portion 114 of the tray 101 by the leveling action of the pin 4 inserted into the through-hole 122, and the ejector 53 is pushed in by the pin 4 having leveled the lock portion 17. As a result, the present embodiment provides a lock mechanism which prevents the flying out of the tray 101 and which is not dependent on spring action yet able to perform the unlocking operation easily, thereby eliminating the spring, reducing the number of components, and reducing the size of the card connector.

In the present embodiment, the socket 1 has a housing 11 for accommodating the tray 101, and a lock portion 17 is provided so as to extend from the proximal portion of the housing 11 upward at an oblique angle relative to the insertion direction of the tray 101. As a result, the lock portion 17 is constituted using a portion of the housing 11.

In the present embodiment, the socket 1 also has a shell 61 for covering the housing 11. The shell 61 has a first extended portion 67 extending from the proximal portion so as to cover at least the top of the lock portion 17, and the first extended portion keeps the pin 4 leveling the lock portion 17 from becoming dislodged at least upwardly. As a result, the lock portion 17 can be reliably leveled using the pin 4.

Figure 11:
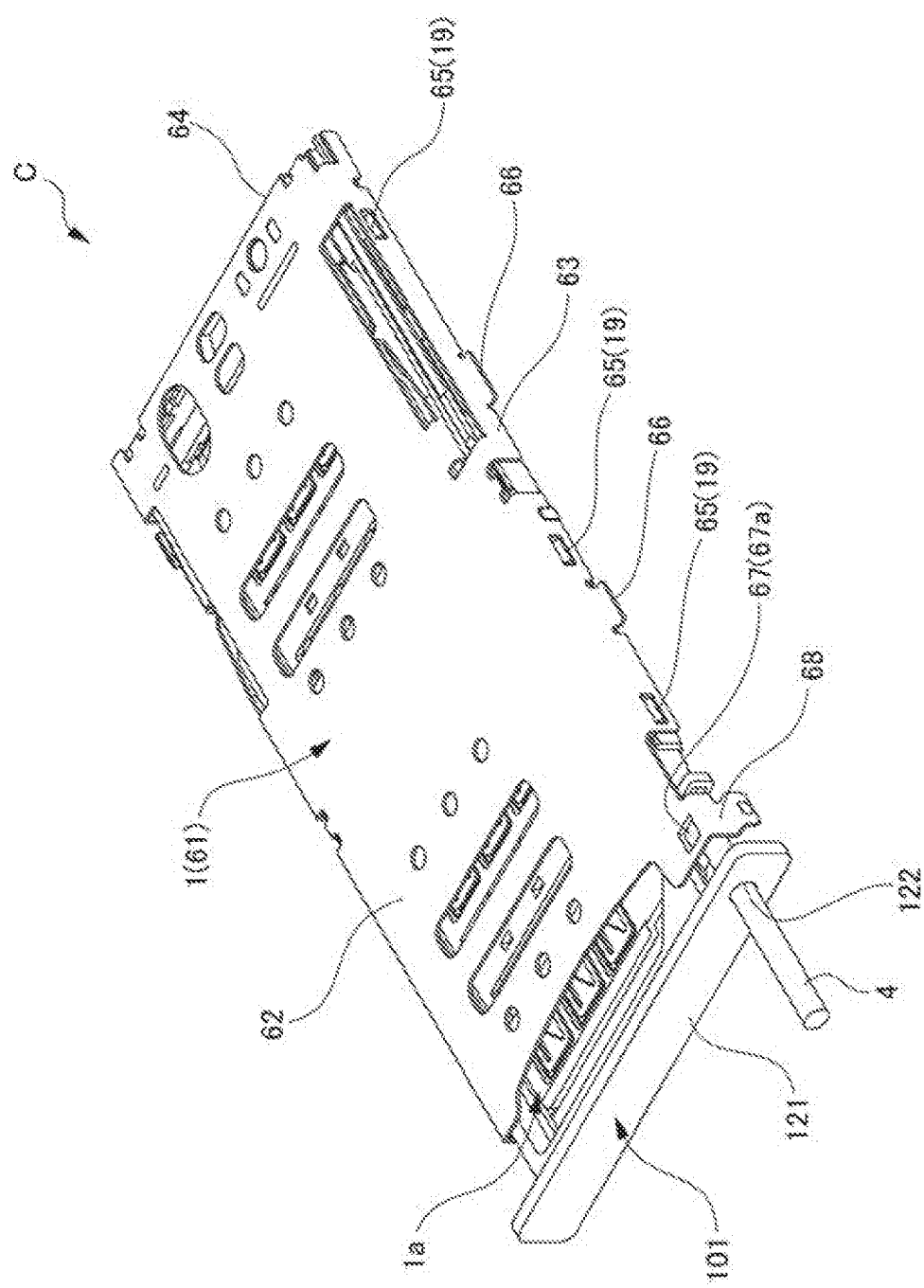
FIG. 11 is a perspective view of the card connector in a second embodiment of the present disclosure (not containing a card, shell removed) showing a pin inserted.

The following is an explanation of the card connector C in a second embodiment of the present disclosure with reference to FIG. 11. Here, the configuration elements identical or comparable to those in the previous embodiment are denoted by the same reference numbers, and the explanation of these configurational elements is incorporated into the explanation of the present embodiment.

FIG. 11 is a perspective view of the card connector in a second embodiment of the present disclosure (not containing a card, shell removed) showing a pin inserted. The card connector C in the second embodiment of the present disclosure shown in FIG. 11 differs from the previous embodiment in that the first extended portion 67 has a recessed portion 67a which narrows the insertion path of the pin 4. When such a recessed portion 67a is formed in the first extended portion 67, the lock portion 17 can be leveled and the tray 101 unlocked even when a pin 4 that is narrower than prescribed is inserted.

Figure 12A:
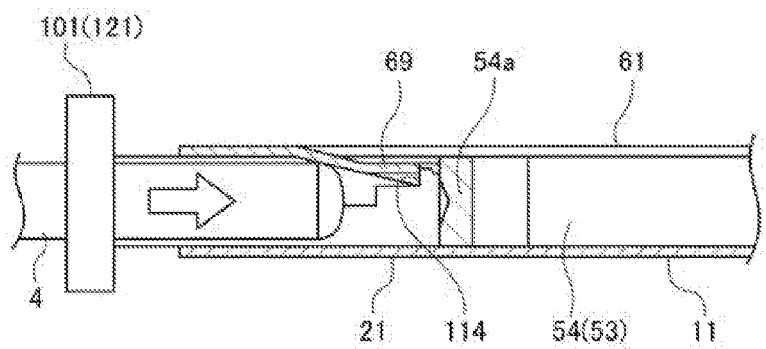
FIG. 12(a) is a partially enlarged side view showing an inserted pin as part of an operation performed in the card connector in a third embodiment of the present disclosure.
Figure 12B:
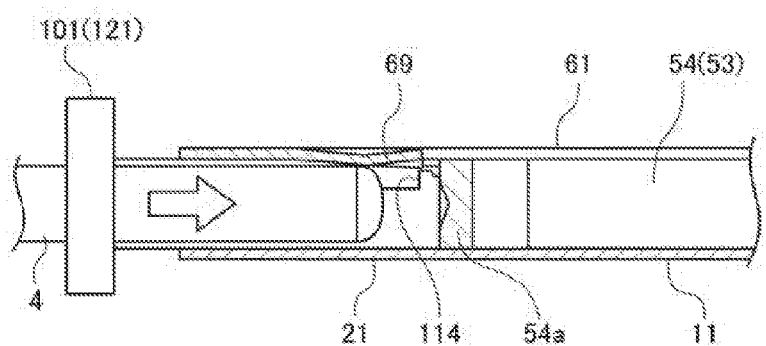
FIG. 12(b) is a partially enlarged side view showing the lock portion leveled (unlocked) by the pin as part of an operation performed in the card connector in a third embodiment of the present disclosure.
Figure 12C:
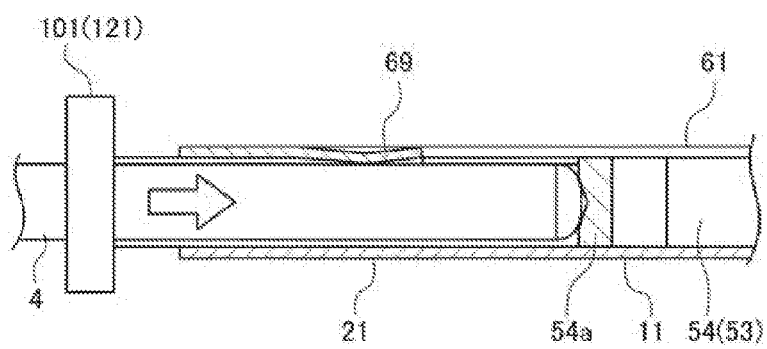
FIG. 12(c) is a partially enlarged side view showing the ejector pushed in by the pin as part of an operation performed in the card connector in a third embodiment of the present disclosure.

The following is an explanation of the card connector C in a third embodiment of the present disclosure with reference to FIGS. 12(a), 12(b) and 12(c). Here, the configuration elements identical or comparable to those in the previous embodiment are denoted by the same reference numbers, and the explanation of these configurational elements is incorporated into the explanation of the present embodiment.

FIGS. 12(a), 12(b) and 12(c) are a set of drawings used to explain the tray ejection operations performed in the card connector in a third embodiment of the present disclosure, in which FIG. 12(a) is a partially enlarged side view showing an inserted pin, FIG. 12(b) is a partially enlarged side view showing the lock portion leveled (unlocked) by the pin, and FIG. 12(c) is a partially enlarged side view showing the ejector pushed in by the pin. The card connector C in the third embodiment of the present disclosure shown in FIGS. 12(a), 12(b) and 12(c) differs from the previous embodiments in that the engaged portion 114 of the tray 101 is formed upside down, and the lock portion 69 engaging the engaged portion 114 is formed not on the housing 11 side but on the shell 61 side. More specifically, the lock portion 69 is formed so as to extend downward obliquely from the proximal portion of the shell 61 with reference to the insertion direction of the tray 101. Here, the same operations and effects as the first embodiment are obtained, and the lock portion 69 can be configured using a portion of the shell 61.

In the card connector C of the third embodiment, the housing 11 has an extended portion 21 extending from the proximal portion so as to cover at least the bottom of the lock portion 69. Because the extended portion 21 keeps the pin 4 leveling the lock portion 69 from becoming dislodged at least downwardly, the lock portion 69 can be reliably leveled using the pin 4.

Preferred embodiments were described above, but the present disclosure is not limited to these embodiments. Various modifications are possible within the scope of the present disclosure as described in the claims.

The invention claimed is:

1. A card connector comprising:
a tray for mounting a card, the tray having a panel portion rising from a proximal portion through which a through-hole has been formed; and
a socket for inserting the tray, the socket being provided at a location facing the through-hole in the tray and having an ejector for ejecting an inserted tray in response to a pushing operation performed using a pin inserted into the through-hole, the socket having a lock portion extending from the proximal portion in an oblique direction vertically with respect to the insertion direction of the tray and engaging an engaged portion of the tray on the proximal side of the ejector, the lock portion being disengaged from the engaged portion of the tray by a leveling action of the pin inserted into the through-hole, and the ejector being pushed in by the pin having leveled the lock portion.

2. A card connector according to claim 1, wherein the socket has a housing for accommodating the tray, and wherein the lock portion extends from a proximal portion of the housing upward obliquely in the insertion direction of the tray.

3. A card connector according to claim 2, wherein the socket has a shell covering the housing, the shell has an extended portion extending from a proximal portion of the shell so as to cover at least a top of the lock portion, and wherein the extended portion provides at least upward clearance for the pin leveling the lock portion.

4. A card connector according to claim 3, wherein the extended portion has a recessed portion narrowing the insertion path of the pin.

5. A card connector according to claim 1, wherein the socket has a housing for accommodating the tray and a shell covering the housing, and wherein the lock portion extends from a proximal portion of the shell downward obliquely in the insertion direction of the tray.

6. A card connector according to claim 5, wherein the housing has an extended portion extending from the proximal portion of the housing so as to cover at least a bottom of the lock portion, and wherein the extended portion provides at least downward clearance for the pin leveling the lock portion.

* * * * *